United States Patent [19]

Taguchi

[11] Patent Number: 4,534,247
[45] Date of Patent: Aug. 13, 1985

[54] METHOD AND APPARATUS FOR CONTROLLING THE FEEDING OF A BANDSAW BLADE IN BANDSAW MACHINES

[75] Inventor: Masayuki Taguchi, Hadano, Japan

[73] Assignee: Amada Company, Limited, Japan

[21] Appl. No.: 501,888

[22] Filed: Jun. 7, 1983

[30] Foreign Application Priority Data

Jun. 7, 1982 [JP] Japan ................................ 57-96322

[51] Int. Cl.³ .............................................. B26D 1/46
[52] U.S. Cl. ........................................ 83/13; 83/789;
83/800; 83/554; 83/617; 83/52
[58] Field of Search .................. 83/800, 13, 801, 789,
83/794–799, 554, 555, 571, 617, 49, 52; 125/21;
51/147, 135 R

[56] References Cited

U.S. PATENT DOCUMENTS

| 1,590,070 | 6/1926 | Bartlett | 83/794 |
| 2,602,987 | 7/1952 | Wells | 83/62 |
| 2,928,439 | 3/1960 | Tester | 83/798 |
| 3,311,415 | 3/1967 | Miller | 125/21 |
| 4,334,669 | 6/1982 | Ross | 83/794 X |
| 4,369,686 | 1/1983 | Sugimoto | 83/801 |

FOREIGN PATENT DOCUMENTS 440234 6/1972 U.S.S.R. ............................. 83/800

Primary Examiner—James M. Meister
Assistant Examiner—John L. Knoble
Attorney, Agent, or Firm—Wigman & Cohen

[57] ABSTRACT

The present invention relates generally to bandsaw machines having a flexible bandsaw blade trained around a plurality of wheels to perform cutting operations and, more particularly, pertains to a method and apparatus for controlling the feeding of the bandsaw blade into a workpiece such that the bandsaw blade is fed intermittently into the workpiece so as to prevent the blade from deflecting off the workpiece and causing work hardening of the workpiece. An alternative embodiment of the invention provides feeding the workpiece into the bandsaw blade in an intermittent fashion.

8 Claims, 4 Drawing Figures

METHOD AND APPARATUS FOR CONTROLLING THE FEEDING OF A BANDSAW BLADE IN BANDSAW MACHINES

BACKGROUND OF THE INVENTION

1. Field of the Invention

The present invention relates generally to bandsaw machines having a flexible bandsaw blade trained around a plurality of wheels or pulleys to perform cutting operations and, more particularly pertains to methods and apparatus for controlling the feeding of the bandsaw blade into workpieces to be cut in bandsaw machines.

2. Description of the Prior Art

The prior art concerning the present invention will be described, by way of example, about what is called a horizontal bandsaw machine, although the present invention is applicable not only to horizontal bandsaw machines but also to vertical bandsaw machines.

As is well known, horizontal bandsaw machines comprise a base on which a workpiece or workpieces to be cut are to be placed and clamped and a cutting head assembly in which a flexible endless bandsaw blade is trained around a pair of wheels or pulleys, one of which is power driven to drive the bandsaw blade. In the cutting head assembly, the bandsaw blade is slidably held and guided with its cutting edge faced perpendicularly downwardly by a pair of guide means at the cutting zone where cutting is performed so that it may cut into the workpiece to be cut. The cutting head assembly is so arranged as to be raised away from and lowered toward the base by a hydraulic motor around a hinge pin or along one or more vertically disposed guide menas. Thus, in each cutting cycle, the cutting head assembly is firstly raised and then lowered toward the base so as to enable the bandsaw blade being driven therein around the wheels to cut the workpiece which has been placed and clamped on the base.

In conventional bandsaw machines of the above described construction, a problem has been the fact that the bandsaw blade will be often deflected by the cutting resistance because of its flexible nature and will not cut into workpieces to be cut. The bandsaw blade will be deflected especially when cutting difficult-to-cut materials such as stainless steels and metal alloys which are generally hard and tough and are mostly subject to work hardening. When the bandsaw blade is deflected and cannot cut into workpieces, it will slide on the workpieces to be cut only to scratch them without performing any cutting action with a result that a hard layer will be produced in kerfs of the workpieces because of work hardening. Such disadvantages with the conventional bandsaw machines will not only result in a lower cutting rate and a poor cutting accuracy but also will cause a short life of the bandsaw blade and a larger vibration and noise during cutting operations.

SUMMARY OF THE INVENTION

It is an object of the present invention to provide a method and apparatus for controlling the feeding of a bandsaw blade in bandsaw machines so that the bandsaw blade may be surely fed into workpieces to be cut without scratching them with no cutting action.

It is therefore another object of the present invention to provide a method and apparatus for controlling the feeding of a bandsaw blade in bandsaw machines so that the life of the bandsaw blade and the cutting accuracy may be increased and vibration and noise may be reduced even in cutting difficult-to-cut materials including those which are subject to work hardening.

In order to accomplish these objects, a bandsaw machine according to the present invention is provided with a means for intermittently stopping the bandsaw blade from feeding into workpieces to be cut.

Other and further objects and advantages of the present invention will be apparent from the following description and accompanying drawings which, by way of illustration, show preferred embodiments of the present invention and the principle thereof.

DESCRIPTION OF THE PREFERRED EMBODIMENTS

Figure 1:
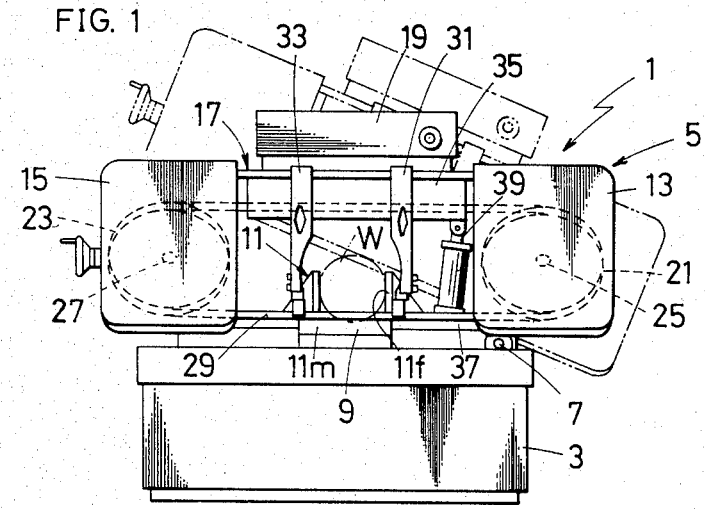
FIG. 1 is a front elevational view of a horizontal bandsaw machine embodying the principles of the present invention.

Referring to FIG. 1, the horizontal bandsaw machine 1 comprises a box-like base 3 and a cutting head assembly 5 which is pivotally connected to the base 3 by means of a hinge pin 7 to be movable up and down toward and away from the same. The base 3 is provided at its top with a work-table 9 on which a workpiece W to be cut can be placed, and the work-table 9 is provided with a vise assembly 11 which has a fixed jaw 11f and a movable jaw 11m to clamp the workpiece W therebetween. The cutting head assembly 5 has spaced housing sections 13 and 15 connected with each other by a beam member 17 and is provided at its top with a control box 19. In the cutting head assembly 5, a pair of a driving wheel 21 and a driven wheel 23 having shafts 25 and 27, respectively are enclosed in the housing sections 13 and 15, respectively, and a flexible endless bandsaw blade 29 is trained therearound so that it may be driven to make a cutting action when the driving wheel 21 is power driven. The bandsaw blade 29 is slidably held or guided with its cutting edge facing perpendicularly downwardly by a pair of a fixed guide assembly 31 and a movable guide assembly 33 so that a cutting stretch may be provided therebetween at the cutting zone of the horizontal bandsaw machine 1. The fixed and movable guide assemblies 31 and 33 are mounted on a guided way 35 which is fixed to the beam member 17 in a manner such that they depend therefrom in parallel with each other. The fixed guide assembly 31 is fixedly mounted on the guide way 35, while the movable guide assembly 33 is so mounted that it may be fixed on the guide way 35 in operation but may be moved toward and away from the fixed guide assembly 31 to adjust the cutting stretch of the bandsaw blade 29 according to the size of the workpiece W to be cut. Also, the cutting head assembly 5 of the above described construction is so arranged as to be swung up and down around the hinge pin 7 by a hydraulic motor 37 of a cylinder type having a piston rod 39 to feed and return the bandsaw blade 29 into and away from the workpiece W to be cut. Thus, the cutting head assembly 5 will be raised when the hydraulic motor 5 is supplied with the hydraulic fluid, and it will be lowered by its own gravity when the hydraulic fluid is drained from the hydraulic motor.

Figure 2:
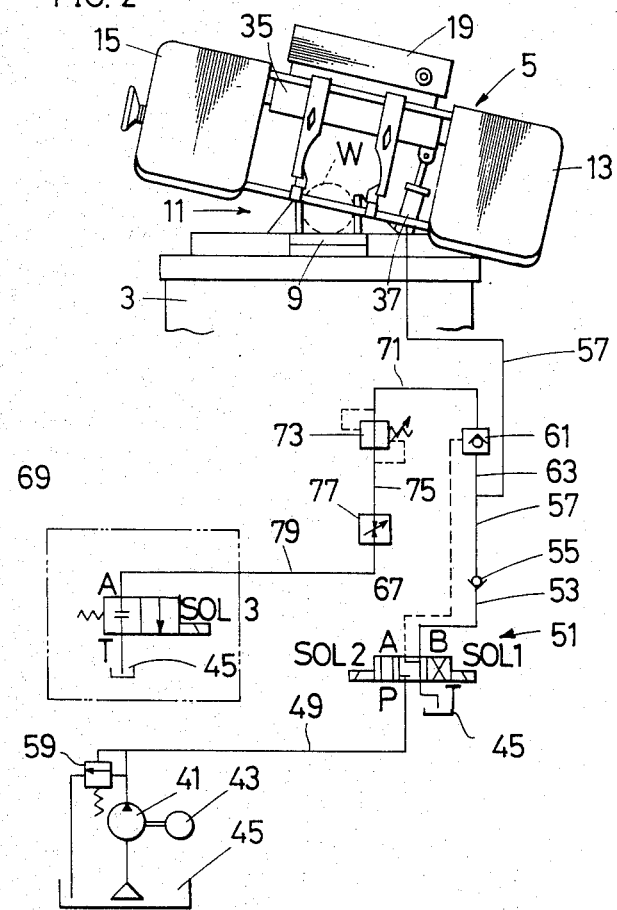
FIG. 2 is a diagrammatic illustration showing the horizontal bandsaw machine shown in FIG. 1 and its hydraulic circuit.

Referring to FIG. 2 the hydraulic motor 37 is so arranged as to be supplied with the hydraulic fluid by a hydraulic pump 41 which is driven by a motor 43 and is connected with a hydraulic tank 45 through a conduit 47. The hydraulic pump 41 is connected to the hydraulic motor 37 by a conduit 49, a solenoid operated valve assembly 51, a conduit 53, a check valve 55 and another conduit 57 to deliver the hydraulic fluid into the hydraulic motor 37. As is conventional, there is provided a relief valve 59 which is connected to the conduit 49 between the hydraulic pump 41 and the solenoid operated valve assembly 51 to return the hydraulic fluid to the hydraulic tank 45 at need. Also, a pilot operated check valve 61 is connected by a conduit 63 to the conduit 57 between the check valve 55 and the hydraulic motor 37 and it is further connected to the solenoid operated valve assembly 51 by a pilot conduit 67 for a purpose to be seen hereinafter. The solenoid operated valve assembly 51 is of a three position type having two solenoids SOL 1 and SOL 2 and four ports A, B, P and T, and it is so arranged that the ports A and B will be connected with the ports T and P, respectively when the solenoid SOL 1 is energized and the ports A and B will be connected with the ports P and T, respectively when the solenoid SOL 2 is energized. In the solenoid operated valve assembly 51, the port P is connected to the hydraulic pump 41 by the conduit 49, and the port T is connected to the hydraulic tank 45 by a drain conduit. Also, the ports A and B of the solenoid operated valve assembly 51 are connected to the pilot conduit 67 and the conduit 57, respectively, leading to the pilot operated check valve 61 and the check valve 55, respectively. The pilot operated check valve 61 is so arranged as to normally or usually block the hydraulic fluid in the hydraulic motor 37 but allow it to drain therethrough when acted on by the pilot pressure of the hydraulic fluid delivered through the pilot conduit 67 from the solenoid operated valve assembly 51. The check valve 55 is so arranged as to allow the hydraulic fluid to go to the hydraulic motor 37 from the solenoid operated valve assembly 51 but prevent it from going back therethrough. Thus, when the solenoid SOL 1 of the solenoid operated valve assembly 51 is energized, the hydraulic fluid will be delivered from the hydraulic pump 41 into the hydraulic motor 37 to raise the cutting head assembly 5. Also, when the solenoid SOL 2 of the solenoid operated valve assembly 51 is energized, the hydraulic fluid from the hydraulic pump 41 will be applied to the pilot operated valve 61 to enable the hyddraulic fluid in the hydraulic motor 37 to drain therethrough to lower the cutting head assembly 5.

Referring further to FIG. 2, the pilot operated check valve 61, which is connected with the hydraulic motor 37 by the conduits 63 and 57, is connected to a valve means such as a solenoid operated valve assembly 69 so as to intermittently drain the hydraulic fluid from the hydraulic motor 37. The pilot operated check valve 61 is connected to the solenoid operated valve assembly 69 through a conduit 71, a reducing valve 73, a conduit 75, a flow control valve 77 and a conduit 79. The reducing valve 73 is provided to adjustably control the hydraulic fluid prevailing in the hydraulic motor 37 to a desired pressure, and the flow control valve 77 is provided so as to adjustably control the flow of the hydraulic fluid out of the hydraulic motor 37. The solenoid operated valve assembly 69 shown in FIG. 2 is of a normally closed two position type which is provided with a solenoid SOL 3 and two ports A and T connected to the conduit 79 and the hydraulic tank 45, respectively, in a manner such that the port A will be connected with the port T when the solenoid SOL 3 is energized. Thus, the solenoid operated valve assembly 69 will allow the hydraulic fluid to drain from the hydraulic motor 37 into the hydraulic tank 45 to lower the cutting head assembly 5 when the solenoid 3 is energized.

As a matter of importance, the solenoid operated valve assembly 69 is so arranged that the solenoid SOL 3 will be intermittently energized and de-energized by a suitable means such as a timer. Thus, according to the present invention, the hydraulic fluid is intermittently drained from the hydraulic motor 37 into the hydraulic tank 45 so that the cutting head assembly 5 may be intermittently lowered together with the bandsaw blade 29.

In the above described arrangement, in operation the solenoid SOL 1 of the solenoid operated valve assembly 51 is firstly energized to supply the hydraulic fluid from the hydraulic pump 41 into the hydraulic motor 37 to raise the cutting head assembly 5 together with the bandsaw blade 29. Then, in order to lower the cutting head assembly 5 to enable the bandsaw blade 29 to cut the workpiece W, the solenoid SOL 1 of the solenoid operated valve assembly 51 is de-energized and simultaneously the solenoid SOL 2 of the same is energized, and also the solenoid SOL 3 of the solenoid operated valve assembly 69 is intermittently energized and de-energized. The solenoid operated valve assembly 51 will flow the hydraulic fluid through the pilot conduit 67 from the hydraulic pump 41 to enable the pilot operated check valve 61 to drain the hydraulic fluid from the hydraulic motor 37 therethrough toward the solenoid operated valve assembly 69 when the solenoid SOL 3 is energized. Also, the solenoid operated valve assembly 69 will enable the hydraulic fluid to intermittently drain from the hydraulic motor 37 into the hydraulic tank 45 through the pilot operated check valve 61 when the solenoid SOL 3 is intermittently energized and de-energized. Thus, when the solenoid SOL 2 of the solenoid operated valve assembly 51 is kept energized and the solenoid SOL 3 of the solenoid operated valve assembly 69 is intermittently energized and dienergized, the cutting head assembly 5 will be intermittently lowered to enable the bandsaw blade 29 to intermittently cut into the workpiece W.

As has been described above, the bandsaw blade 29, according to the present invention, will be intermittently or periodically fed into the workpiece W by the cutting head assembly 5 when the solenoid SOL 3 of the solenoid operated valve assembly 69 is intermittently or periodically energized and de-energized. Accordingly, the bandsaw blade 29 will be fed into the workpiece without being overworked and therefore without being deflected but with a larger feeding force which has been set to optimum for cutting the workpiece W. Therefore, the bandsaw blade 29 according to the present invention, will not slide on the workpiece W nor scratch the same causing a work hardening, and it will make an accurate cutting action at a higher cutting rate and with less vibration and noise. Also, since the bandsaw blade will not slide on the workpiece W scratching without making cutting action, the life of the bandsaw blade 29 will be largely increased according to the present invention. A cutting test in cutting stainless steels with a horizontal bandsaw machine according to the present invention has shown that the cutting rate and the life of the bandsaw blade have been increased three times and the vibration and noise have been decreased by approximately 20% as compared with the conventional bandsaw machines.

Figure 3:
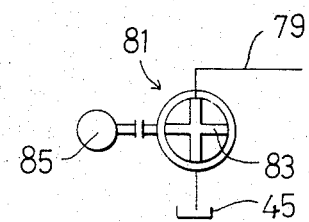
FIG. 3 is a partial view of another embodiment of the present invention of a portion of the horizontal bandsaw machine.

Referring to FIG. 3, the solenoid operated valve assembly 69 shown in FIG. 2 can be replaced by any other suitable means such as a rotary valve means 81 to intermittently or periodically drain the hydraulic fluid from the hydraulic motor 37. The rotary valve means 81 shown in FIG. 3 is provided with a plurality of passages 83 intersecting with each other and it is so designed as to intermittently or periodically connect the conduit 79 and the hydraulic tank 45 shown in FIG. 2 by the passages 83 when rotated. Of course, the rotary valve means 81 is rotatably disposed between the conduit 79 and the hydraulic tank 45 and can be rotated by a suitable motor 85 to enable intermittently or periodically the passages 83 to connect the conduit 79 and the hydraulic tank 45 when rotated.

Figure 4:
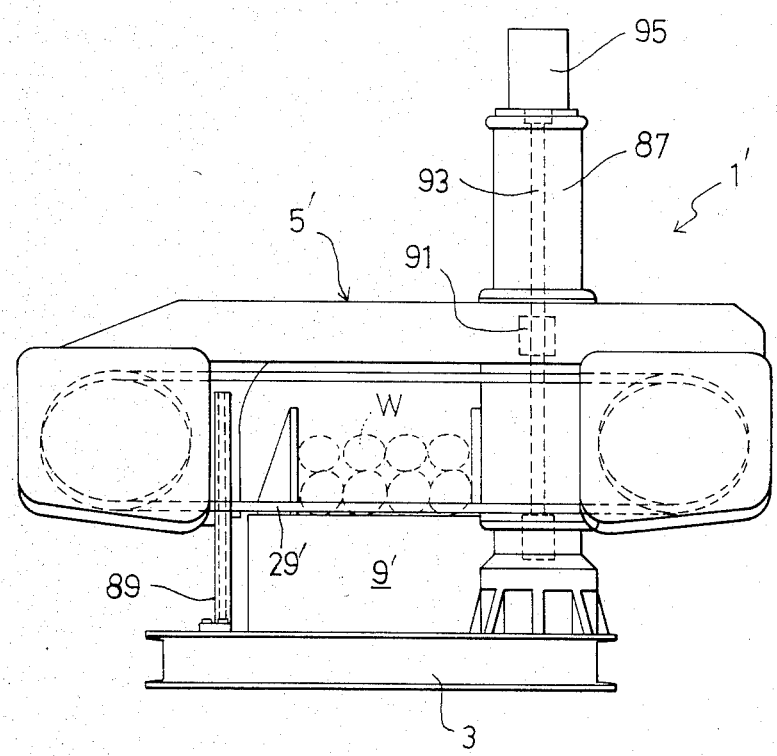
FIG. 4 is a front elevational view of a horizontal bandsaw machine showing another embodiment of the present invention.

Referring to FIG. 4, there is shown another embodiment of the present invention in which a horizontal bandsaw machine 1' comprises a cutting head assembly 5' which is so disposed as to be raised and lowered vertically along a main post 87 and an auxiliary post 89 to carry the bandsaw blade 29'. The main post 87 and the auxiliary post 89 are vertically disposed on a base 3' in parallel with each other to vertically guide the cutting head assembly 5' toward and away from the worktable 9'. Also, in this embodiment, the cutting head assembly 5' is so arranged as to be raised and lowered along the main and auxiliary posts 87 and 89 by a nut 91 and a lead screw 93 which is driven by a suitable means such as a servomotor 95. The nut 91 is fixed to a portion of the cutting head assembly 5', the lead screw 93 is vertically disposed along the main post 87 in engagement with the nut 91 and the servomotor 95 is mounted on the main post 87 so as to rotate and drive the lead screw 93. In this arrangement, when the lead screw 93 is rotated by the servomotor 95, the cutting head assembly 5' will be raised and lowered by the lead screw 93 through the nut 91 to raise and lower the bandsaw blade 29. According to the present invention, the lead screw 93 is intermittently driven by the servomotor 95 to intermittently lower the cutting head assembly 5' so that the bandsaw blade 29' may be intermittently fed into the workpiece W. Thus, it will be understood that the horizontal bandsaw machine 1' shown in FIG. 4 can perform cutting actions in all the same manner the horizontal bandsaw machine 1 shown in FIGS. 1 and 2 when the lead screw 93 is intermittently driven by the servomotor 95.

As has been far described in the above, the purposes of the present invention can be accomplished by providing a bandsaw machine with a means for intermittently feeding the bandsaw blade into workpieces to be cut. However, it will be understood that the purposes of the present invention can be attained by providing a means for intermittently feeding workpieces to be cut into a bandsaw blade, although the bandsaw blade has been described as fed into workpieces in the preferred embodiments. Accordingly, the present invention is applicable not only to horizontal bandsaw machines but also to vertical bandsaw machines in which workpieces to be cut are moved and fed into a bandsaw blade which is driven at a fixed position.

Although a preferred form of the present invention has been illustrated and described, it should be understood that the device is capable of modification by one skilled in the art without departing from the principles of the invention. Accordingly, the scope of the invention is to be limited only by the claim appended hereto.

What I claim is:

1. A method for controlling bandsaw machines having an endless bandsaw blade, comprising:
   applying a feeding force to a workpiece for feeding the workpiece into an endless bandsaw blade for making a cutting; and
   using a timer to periodically interrupt the application of the feeding force of the workpiece into the endless blade.

2. A cutting controlling method for bandsaw machines, comprising:
   applying a feeding force to an endless bandsaw blade for feeding the blade into a workpiece or workpieces; and
   periodically interrupting the application of all feeding forces to the blade by energizing and de-energizing a control means by means of a timing means incorporated within the control means;
   whereby work hardening of the workpiece is reduced.

3. A cutting apparatus, comprising:
   an endless bandsaw blade for cutting a workpiece or workpieces;
   means for applying a feeding force to the blade for feeding the blade into the workpiece or workpieces;
   controlling means for periodically interrupting the application of all feeding forces to the blade; and
   timing means incorporated within the control means for controlling the interruption of the application of the feeding forces onto the blade.

4. A cutting controlling apparatus for cutting a workpiece, comprising:
   a base;
   a cutting blade;
   a cutting head for holding the blade being movable up and down above the base for applying a feeding force for feeding the blade into the workpiece; and
   a selector valve timing means provided in a hydraulic circuit;
   hydraulic motor means for raising and lowering the cutting head so as to periodically interrupt the application of all feeding forces, said motor means being controlled by said timing means.

5. A cutting controlling apparatus according to claim 4 in which the said selector valve means is a solenoid operated valve.

6. A cutting controlling apparatus according to claim 4 in which the said selector valve means is a rotary valve.

7. A cutting controlling apparatus according to claim 4, further comprising a screw means to raise and lower the cutting head and a driving means to periodically rotate the said screw means to thus periodically lower the cutting head.

8. A cutting apparatus, comprising:
   an endless bandsaw blade for cutting a workpiece;
   means for applying a feeding force to the workpiece for feeding the workpiece into the blade; and
   controlling means for periodically interrupting the application of the feeding forces to the workpiece.

* * * * *